United States Patent
Enomoto et al.

(10) Patent No.: US 6,437,922 B2
(45) Date of Patent: Aug. 20, 2002

(54) ZOOM LENS SYSTEM

(75) Inventors: Takashi Enomoto, Chiba; Hiroshi Nomura, Saitama; Takayuki Ito, Saitama; Shinichiro Ishii, Saitama, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 1 day.

(21) Appl. No.: 09/769,458

(22) Filed: Jan. 26, 2001

(30) Foreign Application Priority Data

Jan. 28, 2000 (JP) ......................................... 2000-019916

(51) Int. Cl.[7] .............................................. G02B 15/17
(52) U.S. Cl. ........................ 359/685; 359/689; 359/690; 359/686
(58) Field of Search ................................ 359/684, 690, 359/686, 685

(56) References Cited

U.S. PATENT DOCUMENTS

| 4,917,482 A | 4/1990 | Ito | 359/690 |
| 4,984,877 A | 1/1991 | Ito | 359/692 |
| 5,572,276 A | 11/1996 | Hirakawa | 359/684 |
| 6,028,714 A | 2/2000 | Koyama | 359/683 |

FOREIGN PATENT DOCUMENTS

JP  8-146296  6/1996

*Primary Examiner*—Scott J. Sugarman
(74) *Attorney, Agent, or Firm*—Greenblum & Bernstein, P.L.C.

(57) ABSTRACT

In a short-focal-length side zooming range, a moveable sub-lens group of a zoom lens system is made stationary at one of the object-side and the image-side end. At the intermediate switching focal length, the moveable sub-lens group is moved to the other of the object-side and the image-side end. In a long-focal-length side zooming range, the moveable sub-lens group is made stationary at the other end, and the zoom lens system satisfies the following condition:

$$mNt - mNw < 0 \qquad (1)$$

wherein mNt designates the transverse magnification of the most image-plane side lens group of the zoom lens system when the moveable sub-lens group is at one end; and mNw designates the transverse magnification of the most image-plane side lens group of the zoom lens system when the moveable sub-lens group is at the other end

10 Claims, 7 Drawing Sheets

ZOOM LENS SYSTEM

BACKGROUND OF THE INVENTION

1. Field of the Invention

The present invention relates to a zoom lens system.

2. Description of the Related Art

In a zoom lens system, a requirement for a high zoom ratio and a requirement for miniaturization are not compatible. For example, in a zoom lens system of two-lens-group arrangement which can be miniaturized, if lens-group moving paths are designed, i.e. a solution of the lens-group moving path is obtained, with the aim of obtaining a high zoom ratio, lens groups come into contact with each other at the long focal length extremity, or lens groups and the image plane cause interference therebetween at the short focal length extremity. On the other hand, in the case of a zoom lens system of three-lens-group arrangement, the zoom ratio can be made higher than that of a two-lens-group zoom lens system; however, miniaturization of the zoom lens system is difficult. Furthermore, if the optical power (hereinafter, power) of each lens group is determined to obtain an even higher zoom ratio, error sensitivity of each lens group becomes too high, so that a mechanism which can maintain necessary precision on the operations of the lens system under such a high sensitivity is not practical to be obtained.

SUMMARY OF THE INVENTION

It is an object of the present invention to provide a miniaturized zoom lens system having a high zoom ratio.

In order to achieve the above-mentioned object, there is provided a zoom lens system including relatively moveable more than two zooming lens groups (hereinafter, N zooming lens groups; N 2) in order to vary the focal length. Among the N zooming lens groups, an i-th (i 1, counted from the most object-side zooming lens group) zooming lens group is a switching lens group (predetermined zooming lens group) The switching lens group includes more than two sub-lens groups, and one sub-lens group is made moveable, with respect to other sub-lens groups, to either the object-side end or the image-side end.

In a short-focal-length side zooming range from the short focal length extremity to an intermediate switching focal length, the N zooming lens groups and the i-th zooming lens group are moved towards the object, while (i) distances among the lens groups are varied, and (ii) the moveable sub-lens group is being made stationary at one of the object-side end and the image-side end.

At the intermediate switching focal length, the moveable sub-lens group is moved to the other of the object-side end and the image-side end, and each of the N zooming lens groups and the i-th zooming lens group are moved towards the image plane.

In a long-focal-length side zooming range from the intermediate switching focal length to the long focal length extremity, the N zooming lens groups and the i-th zooming lens group are moved towards the object, while (i) distances among the zooming lens groups are varied, (ii) the moveable sub-lens group is being made stationary at the other end, and (iii) the zoom lens system satisfies the following condition:

$$mNt-mNw<0 \quad (1)$$

wherein mNt designates the transverse magnification of the N-th, i.e., the most image-plane side, zooming lens group at the intermediate switching focal length, under the condition that the moveable sub-lens group of the switching lens group is being made stationary at the other end; and mNw designates the transverse magnification of the N-th, i.e., the most image-plane side, zooming lens group at the intermediate switching focal length, under the condition that the moveable sub-lens group of the switching lens group is being made stationary at the one end.

The most object-side zooming lens group can be formed as the switching lens group (i=1). In this case, the zoom lens system preferably satisfies the following condition:

$$0<(\log Z1/\log Z)<0.2 \quad (2)$$

wherein $Z=ft/fw$;

$Z1=f1t/f1w$;

fw designates the focal length of the entire the zoom lens system at the short focal length extremity;

ft designates the focal length of the entire the zoom lens system at the long focal length extremity;

f1w designates the focal length of the first lens group in the short-focal-length side zooming range; and f1t designates the focal length of the first lens group in the long-focal-length side zooming range.

Furthermore, at least one zooming lens group can be provided on the object side of the switching lens group (i 2). In this case, the zoom lens system preferably satisfies the following condition:

$$0<(\log Zi/\log Z)-(\log Zi'/\log Z')<0.2 \quad (2')$$

wherein $Zi=mit/miw$;

$Z'=ft'/fw$ $Zi'=mit'/miw$;

ft' designates the focal length of the entire the zoom lens system, at the long focal length extremity, when the moveable sub-lens group is being made stationary at the one end;

miw designates the transverse magnification of the switching lens group at the short focal length extremity;

mit designates the transverse magnification of the switching lens group at the long focal length extremity; and mit' designates the transverse magnification of the switching lens group at the long focal length extremity, when the moveable sub-lens group is being made stationary at the one end.

The zoom lens system according to the present invention can satisfy the following condition:

$$0.01<\Delta di/fw<0.3 \quad (3)$$

wherein $\Delta di$ designates the traveling distance of the moveable sub-lens group at the intermediate switching focal length.

Still further, the switching lens group can be formed as a two-lens-group arrangement which is constituted by the moveable sub-lens group and another sub-lens group. In this case, the power of one lens group is preferably different from the other, e.g., if the power of the moveable sub-lens group is positive, the power of the other sub-lens group is negative, and vice versa.

The switching lens group can include a negative lens group and a positive lens group, in this order from the object. In this case, it is preferable that the negative lens group be the moveable sub-lens group.

The present disclosure relates to subject matter contained in Japanese Patent Application No. 2000-019916 (filed on Jan. 28, 2000) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
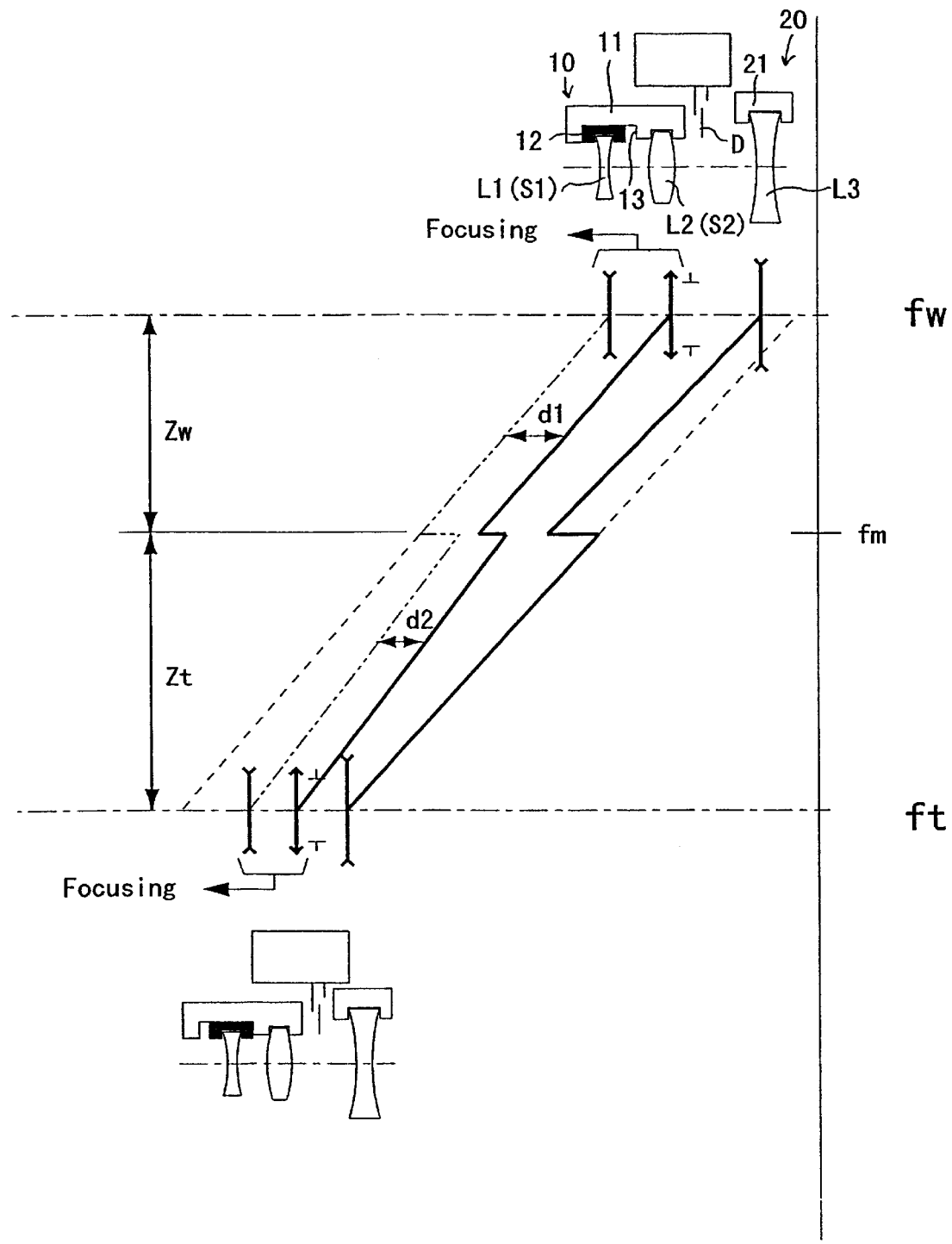
FIG. 1 shows a schematic drawing of lens-group moving paths in a zoom lens system according to a first embodiment of the present invention.

FIG. 1 shows the first embodiment of the zoom lens system. The zoom lens system includes a positive first zooming lens group 10 (predetermined zooming lens group; switching lens group), and a negative second zooming lens group 20, in this order from the object. The first zooming lens group 10 includes a negative first lens group L1 (first sub-lens group S1) and a positive second lens group L2 (second sub-lens group S2), in this order from the object. The second zooming lens group 20 includes a negative third lens group L3. The second sub-lens group S2 of the first zooming lens group 10 is fixed in a first zooming-lens-group frame 11. The first sub-lens group S is mounted on a moveable sub-lens-group frame 12. The moveable sub-lens group frame 12 is made moveable in the optical axis direction, by a predetermined distance, along a guide groove 13 which is formed on the first zooming-lens-group frame 11. The first sub-lens group S1 is alternatively moved to either the object-side extremity at which the moveable sub-lens group frame 12 comes into contact with the front end of the guide groove 13, or the image-plane-side extremity at which the moveable sub-lens group frame 12 comes into contact with the rear end of the guide groove 13 (i=1). The third lens group L3 is fixed in a second zooming-lens-group frame 21. The diaphragm D moves together with the first zooming lens group 10 (first zooming-lens-group frame 11).

The lens-group-moving paths according to the first embodiment enable the first zooming lens group 10 (first zooming-lens-group frame 11) and the second zooming lens group 20 (second zooming-lens-group frame 21) to move, and also enable the moveable sub-lens group frame 12 (first sub-lens group S1) to move along the guide groove 13; and these lens-group-moving paths are determined as follows:

[A] In the short-focal-length side zooming range Zw from the short focal length extremity fw to the intermediate switching focal length fm, the first sub-lens group S1 maintains a distance d1 (the first distance: a longer distance) with respect to the second sub-lens group S2; and the first zooming lens group 10 (first zooming lens group frame 11) and the second zooming lens group 20 (second zooming-lens-group frame 21) are arranged to move towards the object while the distance therebetween is varied;

[B] At the intermediate switching focal length fm, the first zooming lens group 10 (first zooming-lens-group frame 11) and the second zooming lens group 20 (second zooming-lens-group frame 21) move towards the image plane with respect to the long-focal-length side extremity of the short-focal-length side zooming range Zw; and the first sub-lens group S1 moves to the image-plane-side extremity of the guide groove 13, thereby the distance d1 between the first sub-lens group S1 and the second sub-lens group S2 is made shorter to form a shorter distance d2 (the second distance: a shorter distance); and

[C] In the long-focal-length side zooming range Zt from the intermediate switching focal length fin to the long focal length extremity ft, the first sub-lens group S1 maintains the shorter distance d2 with respect to the second sub-lens group S2; and the first zooming lens group 10 (first zooming-lens-group frame 11) and the second zooming lens group 20 (second zooming-lens-group frame 21) move towards the object with respect to the positions thereof which are determined, at the intermediate switching focal length fm, after the zooming lens groups are moved towards the image plane, while the distance between the first and second zooming lens groups is varied.

The lens-group-moving paths for the first zooming lens group 10 (first zooming-lens-group frame 11) and the second zooming lens group 20 (second zooming-lens-group frame 21) are simply depicted as straight lines in FIG. 1. It should however be noted that actual lens-group-moving paths are not necessarily straight lines.

Focusing is performed by integrally moving the first sub-lens group S1 and the second sub-lens group S2, i.e., the first zooming lens group 10 (first zooming-lens-group frame 11) regardless of the zooming ranges.

The lens-group-moving paths have discontinuities at the intermediate switching focal length fm; however, by adequately determining the positions of the first sub-lens group S1 (first lens group L1), the second sub-lens group S2 (second lens group L2) and the third lens group L3 respectively at the short focal length extremity fw, the intermediate switching focal length fin (discontinuity) and the long focal length extremity ft, solutions by which an image is correctly formed can be obtained. According to the lens-group-moving paths with these solutions, a zoom lens system which is miniaturized and has a high zoom ratio can be obtained.

The existence of solutions for the lens-group-moving paths of the first embodiment can be explained by, for example, the following discussions:

The zoom lens system of the first embodiment can be divided into a negative lens group, a positive lens group, and a negative lens group, in this order from the object. Here, the negative and the positive lens groups on the object side (i.e., the first sub-lens group S1 and the second sub lens group S2) are considered to be a positive front lens group (the first zooming lens group 10) in which the relative position of the negative and positive lens groups is fixed respectively at the long focal length extremity ft and at the short focal length extremity fw. Since the distance between the first sub-lens group S1 and the second sub-lens group S2 is longer at the short focal length extremity fw than at the long focal length extremity ft (d1>d2), the focal length Pt of the first zooming lens group 10 at the long focal length extremity ft is longer than the focal length Pw thereof at the short focal length extremity fw, i.e., Pt>Pw. In other words, the first zooming lens group 10 with the focal length Pt and the second zooming lens group 20 can be considered to be a two-lens-group zoom lens system, and the first zooming lens group 10 with the focal length Pw and the second zooming lens group 20 can be considered to be another two-lens group zoom lens system. Therefore solutions for each zoom lens system can be obtained. More concretely, one of the two solutions is the lens-group-moving paths in the short-focal-length side zooming range Zw, and the other solution is the lens-group-moving paths in the long-focal-length side zooming range Zt. However, at the intermediate switching focal length fm, these paths are discontinued, and the distance between the negative and the positive lens groups in the front lens group is not the same. It should be understood that though the movement of the lens groups upon zooming is substantially the same as that of a two-lens-group zoom lens system, a miniaturized zoom lens system with a high zoom ratio can be obtained by (i) providing the discontinuities along the lens-group-moving paths for the first zooming lens group 10 and the second zooming lens group 20 at the intermediate switching focal length fm, and (ii) by varying the distance between the negative and the positive lens groups in the first zooming lens group 10. The above is discussed for the first embodiment; however, the discussions are also applicable for other embodiments by replacing the term of two-lens-group zoom lens system with that of the N-lens-group zoom lens system (N:3 or more).

It is emphasized that, because of the aforementioned discontinuities and varying of distances, the disclosed invention does not fit within the ordinary meaning of an "N lens group" system. That is, the inventive employment of the "switching lens group" removes the disclosed invention from the ordinary "N lens group" definitions of the art (e.g., "two lens group", "three lens group", "four lens group" systems, etc.).

For example, in the case of a lens having a switching lens group and one "conventional" lens group (such as the first embodiment), the present disclosure characterizes, for the purposes of explanation, such a lens both (i) as having three lens groups L1, L2, and L3, and (i) as having a first zooming lens group 10 (with first and second sub-lens groups S1 and S2) and a second zooming lens group 20. However, the use of the two different characterizations does not indicate that the system according to the invention should be considered to be either one of, in this case, a conventional "three lens group" system or a conventional "two lens group" system. Instead, the use of two different characterizations emphasizes that the inventive system should be considered to be outside the ordinary meaning of, in this case, either term "two lens group" or "three lens group." The same principle applies to a lens having two, three, or more "conventional" lens groups in combination with the switching lens group.

Accordingly, the claims and disclosure of the present application should be interpreted to be consistent with the meaning of "lens group"; "sub-lens group"; "switching lens group"; and "zooming lens group" as set forth herein, rather than interpreted to be consistent with definitions of "lens group" or "N lens group" as ordinarily known and employed in the art.

In the zoom lens system of the first embodiment, at the intermediate switching focal length fm, by varying the distance between the first sub-lens group S1 and the second sub-lens group S2, and at the same time, by appropriately moving the zooming lens groups, each lens group can be moved to satisfy condition (1) so that the second zooming lens group 20, i.e., the most-image side zooming lens group, can have two transverse magnifications at the intermediate switching focal length fm.

Condition (1) is obtained as follows:

First, the following relation is obtained with respect to the intermediate switching focal length fm:

$$fm = Pt \times mNt = Pw \times mNw$$

Here, as explained, Pt>Pw, mNt<mNw, then "mNt−mNw <0", i.e., condition (1) is obtained.

By satisfying condition (1) at the intermediate switching focal length fm, a miniaturized zoom lens system with a high zoom ratio can be achieved, while (i) the power of each lens group is not excessively increased, and (ii) the distances among lens groups, and the distance between the most image-side lens group and the image plane are determined so that the lens groups can be moved by a predetermined mechanism to obtain these distances.

If mNt−mNw exceeds the upper limit of condition (1), in other words, if mNt−mNw=0 (no change in the magnification) or mNt−mNw>0, the former (mNt−mNw=0) indicates a conventional zoom lens system in which only one state is provided with respect to the intermediate switching focal length fm; and the latter (mNt−mNw>0) causes (i) interference between the most image-side lens group and the image plane, at the short focal length extremity where the back focal distance is short, and (ii) lens groups come into contact with each other at the long focal length extremity where lens groups come closer to each other. Due to these factors, a high zoom ratio cannot be obtained. Condition (1) can be applied not only to a two-lens-group zoom lens system, but also to a zoom lens system having N lens groups (N: more than 2) thereof.

Figure 2A:
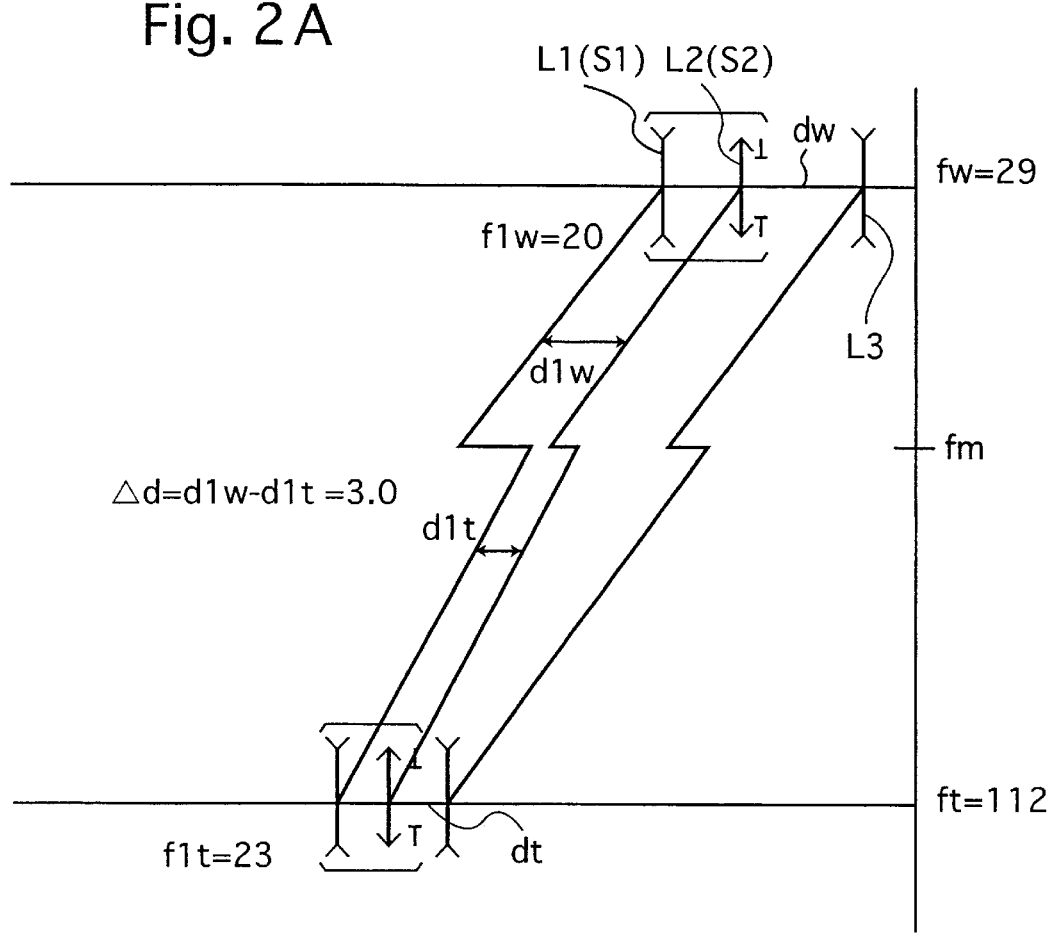
FIG. 2A is a drawing for explaining conditions (2) and (3) applied to the zoom lens system shown in FIG. 1.
Figure 2B:
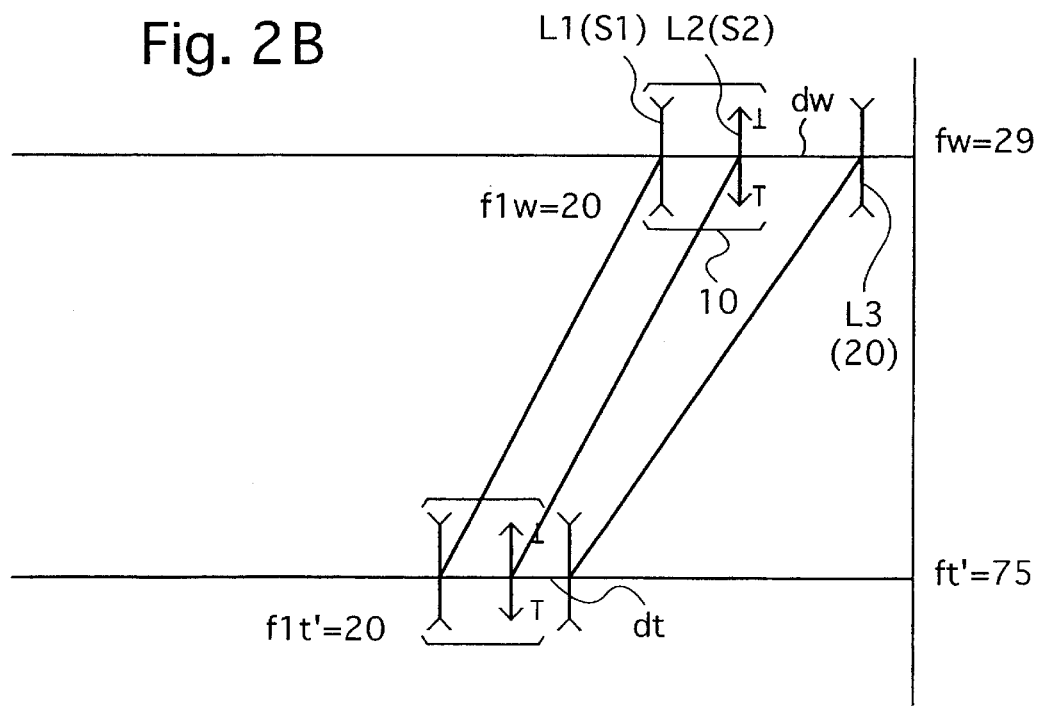
FIG. 2B shows a comparative example with respect to FIG. 2A.

FIG. 2A is the drawing for explaining conditions (2) and (3) applied to the zoom lens system shown in FIG. 1. FIG. 2B shows a comparative example with respect to FIG. 2A. More concretely, FIG. 2A corresponds to FIG. 1, while FIG. 2B indicates a comparative example where no switching lens group is provided, i.e., the first lens group L1 (first sub-lens group S1) and the second lens group L2 (second sub-lens group S2), which constitute the negative first zooming lens group 10, are not relatively moveable over the entire zooming range. Table 1 shows data of the zoom lens system with respect to the first embodiment and the comparative example.

TABLE 1

[Embodiment 1]

|  |  | Focal Length |
|---|---|---|
| First Zooming Lens Group | First Sub-Lens Group S1 | −32.87 |
|  | Second Sub-Lens Group S2 | 16.50 |

TABLE 1-continued

[Embodiment 1]

| Second Zooming Lens Group | | | −19.62 | |
|---|---|---|---|---|

| Focal Length of Entire Zoom Lens System | | | | |
|---|---|---|---|---|
| | fm = 60 | | | |
| | fw = 29 | Zw | Zt | ft = 112 |
| e1 | 10.12 | 10.12 | 7.12 | 7.12 |
| e2 | 21.00 | 13.85 | 16.02 | 12.51 |

'e1' designates the distance between the second principal point of the first sub-lens group S1 and the first principal point of the second sub-lens group S2.

'e2' designates the distance between the second principal point of the second sub-lens group S2 and the first principal point of the second zooming lens group 20.

[Comparative Example]

| | The Focal Length of Entire Zoom Lens System | |
|---|---|---|
| | fw = 29 | ft' = 74.98 |
| e1 | 10.12 | 10.12 |
| e2 | 21.00 | 12.51 |

In FIGS. 2A and 2B, fw designates the focal length of the entire zoom lens system at the short focal length extremity (fw=29 mm);

ft designates the focal length of the entire zoom lens system at the long focal length extremity (ft=112 mm);

f1w designates the focal length of the first lens group L1 in the short-focal-length side zooming range (f1w=20 mm); and f1t designates the focal length of the first lens group L1 in the long-focal-length side zooming range (f1t=23 mm); and Δd designates the traveling distance the moveable sub-lens group S1 at the intermediate switching focal length fm ((d1w−d1t)=3.0mm).

Accordingly,

Z=ft/fw =112/29

Z1=f1t/f1w=23/20

LogZ1/log Z=0.103, and thus satisfying condition (2).

In FIGS. 2A and 2B, (i) the corresponding fist lens groups L1 (moveable first sub-lens groups S1), the corresponding second lens groups L2 (second sub-lens groups S2) and the corresponding third lens group L3 have the identical arrangements and power; and (ii) the corresponding distances dw, at the short focal length extremity, between the first zooming lens group 10 and the second zooming lens group 20 are identical, and so are the corresponding distances dt at the long focal length extremity.

In the first embodiment, ft' designates the focal length of the entire the zoom lens system, at the long focal length extremity, when the fist lens groups L1 (moveable first sub-lens groups S1) is being made stationary at the object-side end of the guide groove 13 (ft'=75 mm).

Figure 3:
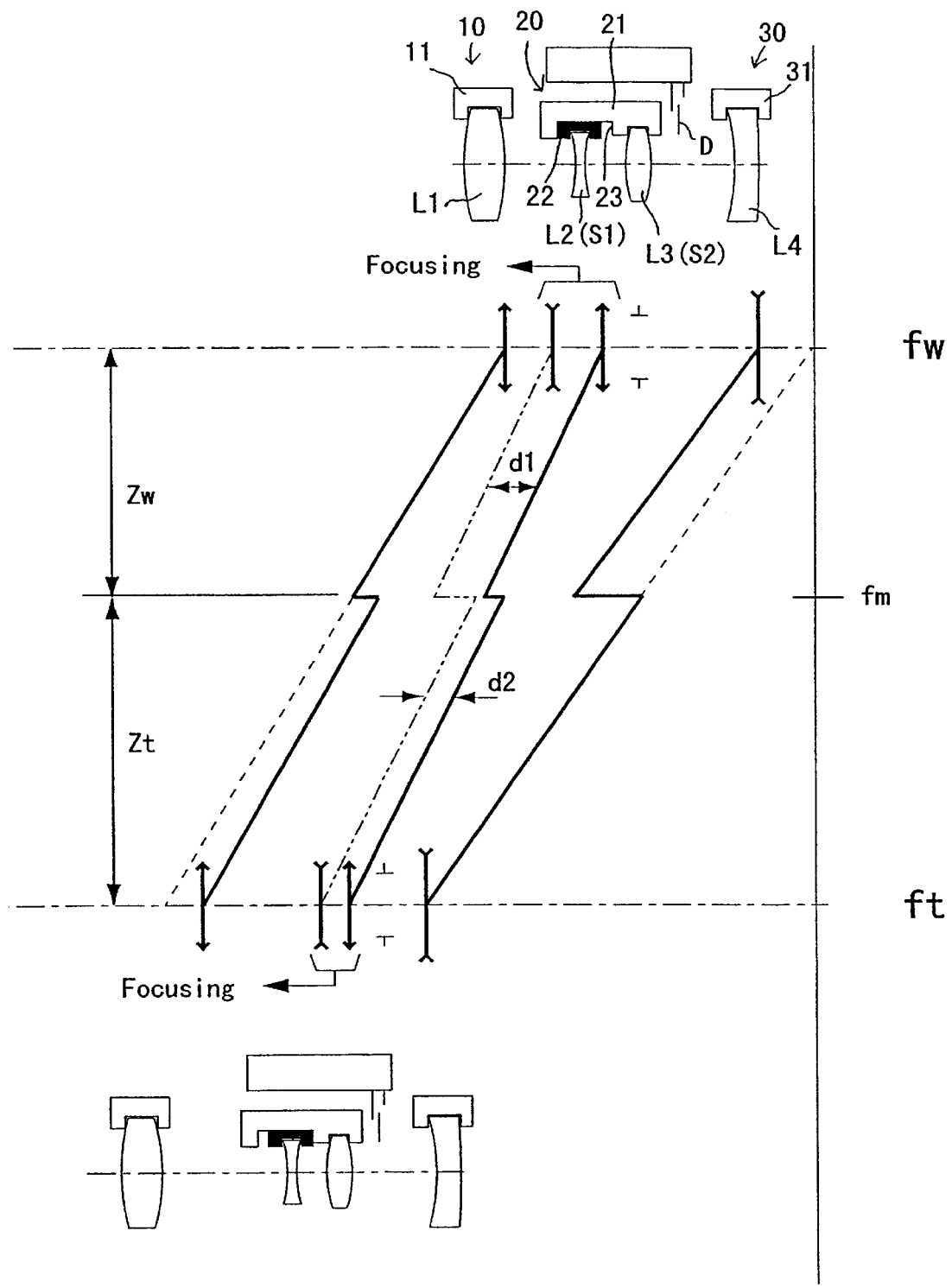
FIG. 3 shows a schematic drawing of lens-group moving paths in the zoom lens system according to a second embodiment of the present invention.

FIG. 3 shows the second embodiment of the zoom lens system. The zoom lens system includes a positive first zooming lens group 10, a positive second zooming lens group 20 and a negative third zooming lens group 30, in this order from the object. The first zooming lens group 10 includes a positive first lens group L1. The second zooming lens group 20 (predetermined zooming lens group; switching lens group) includes a negative second lens group L2 (first sub-lens group S1) and a positive third lens group L3 (second sub-lens group S2), in this order from the object. The third zooming lens group 30 includes a negative fourth lens group L4. The first lens group L1 is fixed in a first zooming-lens-group frame 11. The second sub-lens group S2 of the second zooming lens group 20 is fixed in a second zooming-lens-group frame 21. The first sub-lens group S1 is mounted on a moveable sub-lens group frame 22. The moveable sub-lens group frame 22 is arranged to move, in the optical axis direction, by a predetermined distance, along a guide groove 23 which is formed on the second zooming-lens-group frame 21. The first sub-lens group S1 is alternatively moved to either the object-side extremity at which the moveable sub-lens group frame 22 comes into contact with the front end of the guide groove 23, or the image-plane-side extremity at which the moveable sub-lens group frame 22 comes into contact with the rear end of the guide groove 23 (i=2). The fourth lens group L4 is fixed in a third zooming-lens-group frame 31. The diaphragm D is arranged to move together with the second zooming lens group 20 (second zooming-lens-group frame 21).

The lens-group-moving paths according to the second embodiment enable the first zooming lens group 10 (first zooming-lens-group frame 11), the second zooming lens group 20 (second zooming-lens-group frame 21) and the third zooming lens group 30 (third zooming-lens-group frame 31) to move, and also enable the moveable sub-lens group frame 22 (first sub-lens group S1) to move along the guide groove 23; and these lens-group-moving paths are determined as follows:

[A] In the short-focal-length side zooming range Zw from the short focal length extremity fw to the intermediate switching focal length fm, the first sub-lens group S1 maintains a distance d1 (the first distance: a longer distance) with respect to the second sub-lens group S2; and the first zooming lens group 10 (first zooming lens group frame 11), the second zooming lens group 20 (second zooming-lens-group frame 21) and third zooming lens group 30 (third zooming-lens-group frame 31) are arranged to move towards the object while the distances therebetween are varied;

[B] At the intermediate switching focal length fm, the first zooming lens group 10 (first zooming-lens-group frame 11), the second zooming lens group 20 (second zooming-lens-group frame 21) and third zooming lens group 30 (third zooming-lens-group frame 31) move towards the image plane with respect to the long-focal-length side extremity of the short-focal-length side zooming range Zw; and the first sub-lens group S1 moves to the image-plane-side extremity of the guide groove 23, thereby the distance d1 between the first sub-lens group S1 and the second sub-lens group S2 is made shorter to form a shorter distance d2 (the second distance: a shorter distance); and

[C] In the long-focal-length side zooming range Zt from the intermediate switching focal length fin to the long focal length extremity ft, the first sub-lens group S1 maintains the shorter distance d2 with respect to the second sub-lens group S2; and the first zooming lens group 10 (first zooming-lens-group frame 11), the second zooming lens group 20 (second zooming-lens-group frame 21) and the third zooming lens group 30 (third zooming-lens-group frame 31) move towards the object with respect to the positions thereof which are determined, at the intermediate switching focal length fm, after the lens groups are moved towards the image plane, while the distances among the first through third lens groups are varied.

The lens-group-moving paths for the first zooming lens group 10 (first zooming-lens-group frame 11), the second zooming lens group 20 (second zooming-lens-group frame 21) and the third zooming lens group 30 (third zooming-lens-group frame 31) are simply depicted as straight lines in FIG. 3. It should however be noted that actual lens-group-moving paths are not necessarily straight lines.

Focusing is performed by integrally moving the first sub-lens group S1 and the second sub-lens group S2, i.e., the second zooming lens group 20 (second zooming-lens-group frame 21) regardless of the zooming ranges.

Similar to the first embodiment, the lens-group-moving paths have discontinuities at the intermediate switching focal length fm; however, by adequately determining the positions of the first lens group L1, the first sub-lens group S1 (second lens group L2), the second sub-lens group S2 (third lens group L3) and the fourth lens group L4 respectively at the short focal length extremity fw, the intermediate switching focal length fm (discontinuity) and the long focal length extremity ft, solutions by which an image is correctly formed can be obtained. According to the lens-group-moving paths with these solutions, a zoom lens system which is miniaturized and has a high zoom ratio can be obtained.

Also, similar to the first embodiment, in the zoom lens system of the second embodiment, at the intermediate switching focal length fm, by varying the distance between the first sub-lens group S1 and the second sub-lens group S2, and at the same time, by appropriately moving the zooming lens groups, each lens group can be moved to satisfy condition (1) so that the third zooming lens group 30, i.e., the most-image side lens group, can have two transverse magnifications at the intermediate switching focal length fm.

Figure 4A:
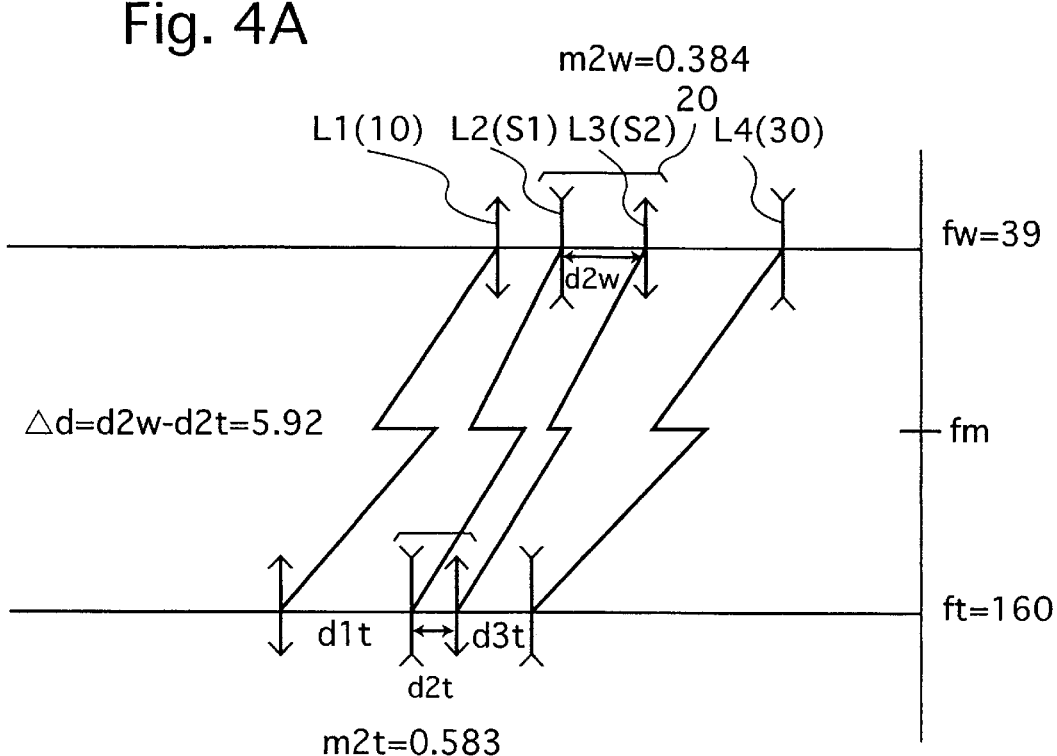
FIG. 4A is a drawing for explaining conditions (2') and (3) applied to the zoom lens system shown in FIG. 3.
Figure 4B:
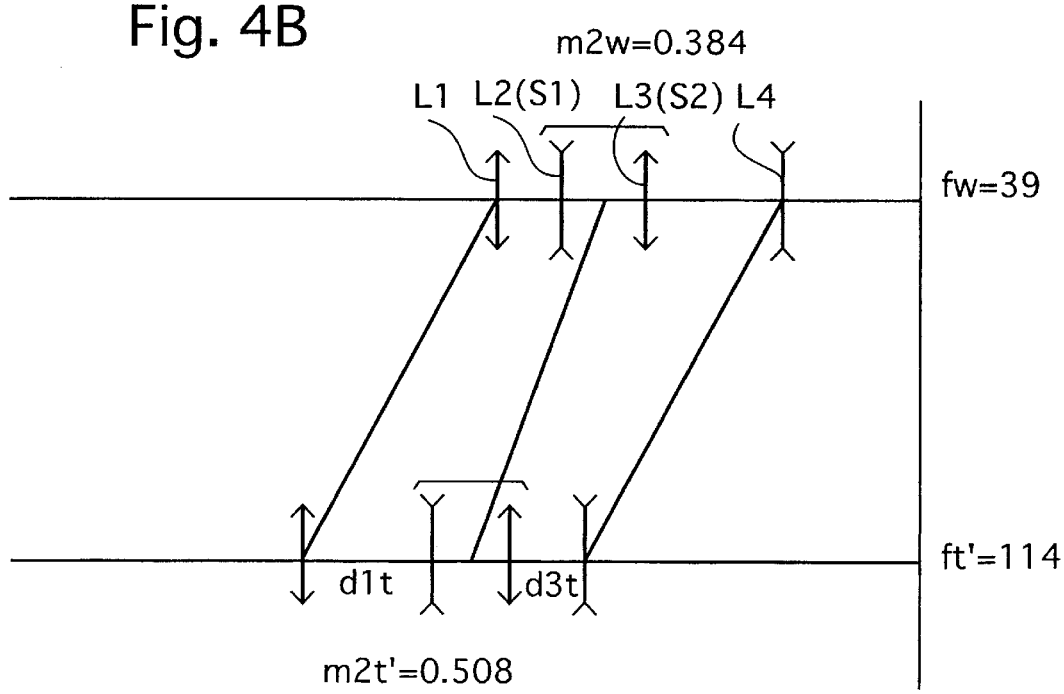
FIG. 4B shows a comparative example with respect to FIG. 4A.

FIG. 4A is the drawing for explaining conditions (2') and (3) applied to the zoom lens system shown in FIG. 3. FIG. 4B shows a comparative example with respect to FIG. 4A. More concretely, FIG. 4A corresponds to FIG. 3, while FIG. 4B indicates a comparative example where no switching lens group is provided, i.e., the negative second lens group L2 (first sub-lens group S1) and the positive third lens group L3 (second sub-lens group S2), which constitute the second zooming lens group 20, are not relatively moveable over the entire zooming range. Table 2 shows data of the zoom lens system with respect to the second embodiment and the comparative example.

TABLE 2

[Embodiment 2]

|  |  | Focal Length |
| --- | --- | --- |
| First Zooming Lens Group |  | 68.34 |
| Second Zooming Lens Group | First Sub-Lens Group S1 | −25.38 |
|  | Second Sub-Lens Group S2 | 18.81 |
| Third Zooming Lens Group |  | −20.55 |

| Focal Length of Entire Zoom Lens System | | | |
| --- | --- | --- | --- |
| | fm = 80 | | |
| fw = 39.4 | Zw | Zt | ft = 160 |

TABLE 2-continued

[Embodiment 2]

|  |  |  |  |  |
| --- | --- | --- | --- | --- |
| g1 | 1.72 | 10.63 | 13.72 | 22.59 |
| g2 | 7.95 | 7.95 | 2.03 | 2.03 |
| g3 | 23.70 | 16.06 | 19.17 | 12.17 |

'g1' designates the distance between the second principal point of the first zooming lens group 10 and the first principal point of the first sub-lens group S1.

'g2' designates the distance between the second principal point of the first sub-lens group S1 and the first principal point of the second sub-lens group S2.

'g3' designates the distance between the second principal point of the second sub-lens group S2 and the first principal point of the third zooming lens group 30.

[Comparative Example 2]

| | The Focal Length of Entire Zoom Lens System | |
| --- | --- | --- |
| | fw = 39.4 | ft' = 114.3 |
| g1 | 1.72 | 22.59 |
| g2 | 7.95 | 7.95 |
| g3 | 23.70 | 12.17 |

In FIGS. 4A and 4B, fw designates the focal length of the entire zoom lens system at the short focal length extremity (fw=39 mm);

ft designates the focal length of the entire zoom lens system at the long focal length extremity (ft=160 mm);

ft' designates the focal length of the entire the zoom lens system, at the long focal length extremity, when the moveable sub-lens groups S1 of the switching lens group (second zooming lens group 20) is being made stationary at the object-side extremity of the guide groove 23 (ft'=114 mm);

m2w designates the transverse magnification of the switching lens group (second zooming lens group 20) at the short focal length extremity (m2w=0.384);

m2t designates the transverse magnification of the switching lens group (second zooming lens group 20) at the long focal length extremity (m2t=0.583);

m2t' designates the transverse magnification, at the long focal length extremity, when the moveable sub-lens groups S1 of the switching lens group (second zooming lens group 20) is being made stationary at the object-side extremity of the guide groove 23 (m2t'=0.508);

Δd designates the traveling distance the moveable sub-lens group S1 at the intermediate switching focal length fm ((d2w−d2t)=5.92 mm).

Accordingly,

Z=ft/fw=160/39

Z2=m2t/m2w=0.583/0.384

Z'=ft'/fw=114/39

Z2'=m2t'/m2w=0.508/0.384

(LogZ2/log Z)−(LogZ2'/log Z')=0.03, and thus satisfying condition (2').

Conditions (2) and (2') specify the ratio of the zoom ratio of the switching lens group according to the switching operation at the intermediate switching focal length fm to that of the entire zoom lens system. These conditions are provided for obtaining more preferable zooming effects on the zoom lens system.

If (log Z1/log Z) and ((logzi/log Z)−(logzi'/logz')) exceed the upper limit of conditions (2) and (2'), the traveling distance of the moveable sub-lens group S1 of the switching lens group becomes long, so that the diameter and length of the zoom lens system become large, which causes an increase of the size of the entire zoom lens system.

If (log Z1/log Z) and ((logzi/log Z)−(log Zi'/log Z')) exceed the lower limit of conditions (2) and (2'), zooming effects of the moveable sub-lens group S1 in the switching lens group is diminished, thereby a high zoom ratio and miniaturization cannot be achieved.

Condition (3) specifies the traveling distance of the moveable sub-lens group S1 in the switching lens group. By satisfying this condition, zooming effects due to the moveable sub-lens group S1 can be obtained, and both a high zoom ratio and miniaturization of the zoom lens system can be achieved, while the traveling distance of the moveable sub-lens group S1 in the switching lens group can be reduced.

If the traveling distance of the moveable sub-lens group S1 becomes long to the extent that Δdi/fw exceeds the upper limit of condition (3), the diameter and length of the zoom lens system become large, so that the size of the entire zoom lens system has to be increased.

If the traveling distance of the moveable sub-lens group S1 becomes short to the extent that Δdi/fw exceeds the lower limit of condition (3), zooming effects due to the moveable sub-lens group S1 are diminished, so that a high zoom ratio and miniaturization of the zoom lens system cannot be achieved.

In the first and second embodiments, the first sub-lens group S1 is made moveable with respect to the second sub-lens group S2. In other words, the second sub-lens group S2 is fixed in the first zooming-lens-group frame 11 or the second zooming-lens-group frame 21, the first sub-lens group S1 is made moveable with respect to the first zooming-lens-group frame 11 or the second zooming-lens-group frame 21. However, this relation can be reversed, and a reversed arrangement will be explained as the third embodiment according to FIG. 7 in which the first embodiment is modified, i.e., the first sub-lens group S1 is fixed in the first zooming-lens-group frame 11, and the second sub-lens group S2 is made moveable with respect to the first zooming-lens-group frame 11.

Figure 7:
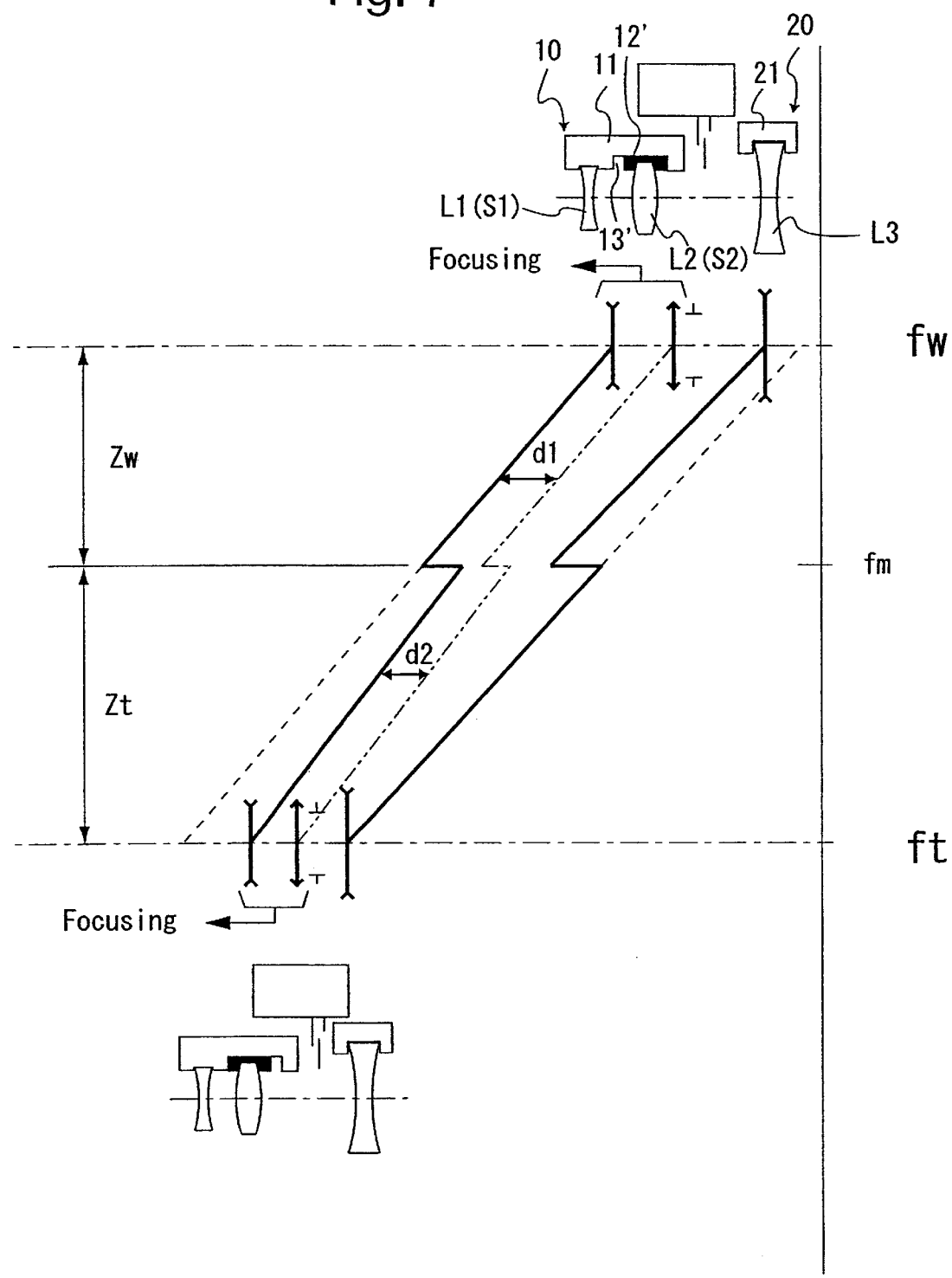
FIG. 7 shows a schematic drawing of lens-group moving paths for zooming in the zoom lens system according to a third embodiment of the present invention.

More concretely, in FIG. 7, the zoom lens system includes the positive first zooming lens group 10 (predetermined zooming lens group; switching lens group), and the negative second zooming lens group 20, in this order from the object. The first zooming lens group 10 includes the negative first lens group L1 (first sub-lens group S1) and a positive second lens group L2 (second sub-lens group S2), in this order from the object. The second zooming lens group 20 includes a negative third lens group L3. The first sub-lens group S1 of the first zooming lens group 10 is fixed in the first zooming-lens-group frame 11. On the other hand, a second zooming-lens-group frame 12' in which the second sub-lens group S2 is supported is made moveable in the optical axis direction, by a predetermined distance, along a guide groove 13' which is formed on the first zooming-lens-group frame 11. The second sub-lens group S2 is alternatively moved to either the object-side extremity at which the moveable sub-lens-group frame 12' comes into contact with the front end of the guide groove 13', or the image-plane-side extremity at which the moveable sub-lens group frame 12' comes into contact with the rear end of the guide groove 13'. The third lens group L3 is fixed in the second zooming-lens-group frame 21. The diaphragm D moves together with the first zooming lens group 10 (first zooming-lens-group frame 11).

The lens-group-moving paths according to the third embodiment enable the first zooming lens group 10 (first zooming-lens-group frame 11) and the second zooming lens group 20 (second zooming-lens-group frame 21) to move, and also enable the moveable sub-lens group frame 12' (second sub-lens group S2) to move along the guide groove 13'; and these lens-group-moving paths are determined as follows:

[A] In the short-focal-length side zooming range Zw from the short focal length extremity fw to the intermediate switching focal length fm, the second sub-lens group S2 maintains a distance d1 (the first distance: a longer distance) with respect to the first sub-lens group S1; and the first zooming lens group 10 (first zooming lens group frame 11) and the second zooming lens group 20 (second zooming-lens-group frame 21) are arranged to move towards the object while the distance therebetween is varied;

[B] At the intermediate switching focal length fm, the first zooming lens group 10 (first zooming-lens-group frame 11) and the second zooming lens group 20 (second zooming-lens-group frame 21) move towards the image plane with respect to the long-focal-length side extremity of the short-focal-length side zooming range Zw; and the second sub-lens group S2 moves to the object-side extremity of the guide groove 13', thereby the distance d1 between the first sub-lens group S1 and the second sub-lens group S2 is made shorter to form a shorter distance d2 (the second distance: a shorter distance); and

[C] In the long-focal-length side zooming range Zt from the intermediate switching focal length fn to the long focal length extremity ft, the second sub-lens group S2 maintains the shorter distance d2 with respect to the first sub-lens group S1; and the first zooming lens group 10 (first zooming-lens-group frame 11) and the second zooming lens group 20 (second zooming-lens-group frame 21) move towards the object with respect to the positions thereof which are determined, at the intermediate switching focal length fm, after the lens groups are moved towards the image plane, while the distance between the first and second lens groups is varied.

The discussions in regard to conditions (1) through (3) are also applicable to the third embodiment shown in FIG. 7.

Figure 5:
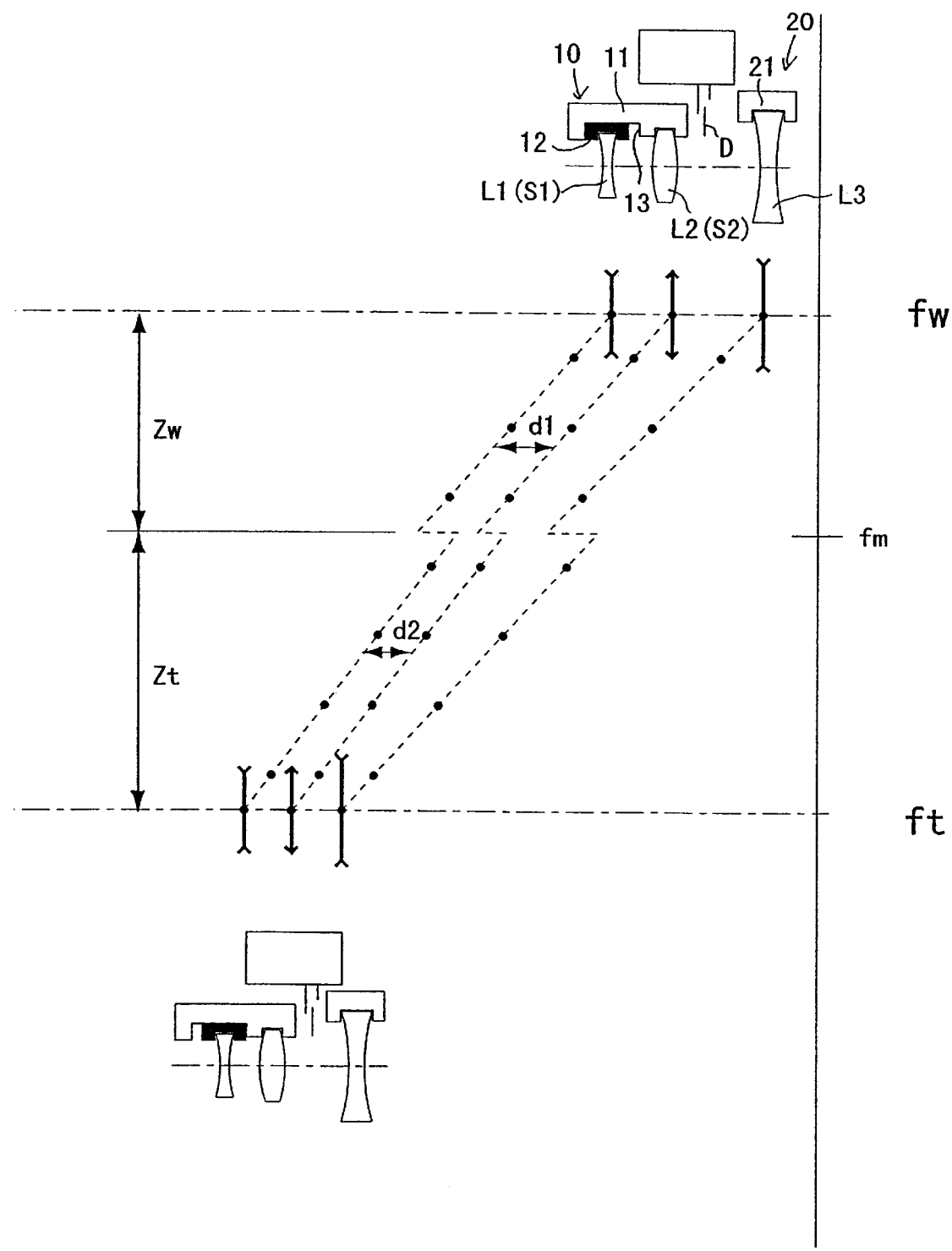
FIG. 5 shows an example of stopping positions of the lens groups when a photographic operation is carried out.
Figure 6:
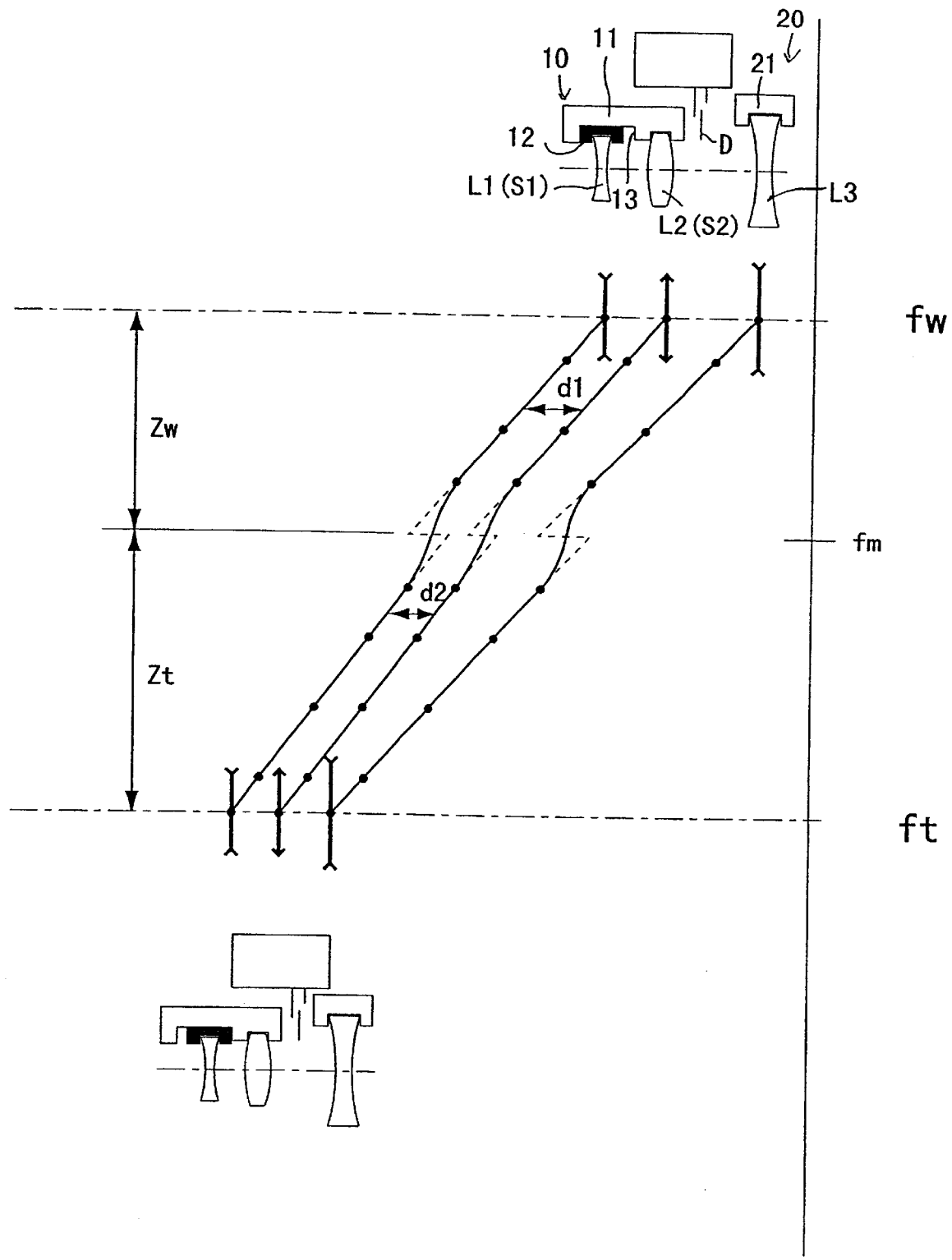
FIG. 6 shows an example of the stopping positions of the lens groups, and an example of actual moving-paths thereof.

It is practical to apply the above-described zoom lens system to a photographing lens system of a camera in which the photographing lens system and a finder optical system are independently provided. Moreover, with respect to each lens group, positions at which the lens group stops upon zooming are preferably determined in a stepwise manner along the lens-group-moving path, i.e., it is preferable to provide a plurality of focal-length steps. FIGS. 5 and 6 show that positions for stopping each lens group are determined in a stepwise manner along the lens-group-moving paths. Since these lens systems shown in FIGS. 5 and 6 are the same as that of the first embodiment, the identical components are provided with the same numerals. The lens-group-moving paths are depicted with dotted lines; and positions at which the first lens group frame 11 and the second lens group frame 21 are to be stopped are indicated with black dots along the dotted lines. Further, in FIG. 6, the dots are connected by smooth curved lines. According to an actual mechanical structure, the first lens group frame 11 and the second lens group frame 21 can be moved along such smooth curved lines.

In the embodiments, each lens group is illustrated as a single lens element; however, a lens group can of course include a plurality of lens elements.

The numerical values of each condition for each embodiment are shown in Table 3.

TABLE 3

|  | Embodiment 1 | Embodiment 2 |
| --- | --- | --- |
| Condition (1) | −0.33 | −0.54 |
| Condition (2) | 0.103 | — |
| Condition (2') | — | 0.03 |
| Condition (3) | 0.10 | 0.15 |

As can be understood from Table 3, the first embodiment satisfies conditions (1), (2) and (3); and the second embodiment satisfies conditions (1), (2') and (3).

According to the above description, a miniaturized zoom lens system can be provided wherein a high zoom ratio can be obtained.

What is claimed is:

1. A zoom lens system comprising a plurality of zooming lens groups which are relatively moveable in order to vary the focal length of said zoom lens system, wherein among said plural zooming lens groups, a predetermined zooming lens group which comprises a switching lens group comprising at least two sub-lens groups;

wherein one of said sub-lens groups of said switching lens group is made moveable, with respect to other sub-lens groups, to either an object-side end or an image-side end;

wherein in a short-focal-length side zooming range from the short focal length extremity to an intermediate switching focal length, said plural zooming lens groups and said predetermined zooming lens group are moved towards said object, while distances among said zooming lens groups are varied, and while said moveable sub-lens group of said predetermined zooming lens group is being made stationary at one of said object-side end and said image-side end;

wherein at said intermediate switching focal length, said moveable sub-lens group is moved to the other of said object-side end and said image-side end, and each of plural zooming lens groups and said predetermined zooming lens group are moved towards the image plane;

wherein in a long-focal-length side zooming range from said intermediate switching focal length to the long focal length extremity, said plural zooming lens groups and said predetermined zooming lens group are moved towards said object, while distances among said zooming lens groups are varied, and while said moveable sub-lens group is being made stationary at said other of said object-side end and said image-side end; and wherein said zoom lens system satisfies the following condition:

$$mNt - mNw < 0$$

wherein mNt designates the transverse magnification, at said intermediate switching focal length, of the most image-plane-side zooming lens group among said plural zooming lens groups, under the condition that said moveable sub-lens group of said switching lens group is being made stationary at said other of said object-side end and said image-side end; and mNw designates the transverse magnification, at said intermediate switching focal length, of the most image-plane-side zooming lens group among said plural zooming lens group, under the condition that said moveable sub-lens group of said switching lens group is being made stationary at said one of said object-side end and said image-side end.

2. The zoom lens system according to claim 1, wherein the most object-side zooming lens group comprises said switching lens group, and said zoom lens system satisfies the following condition:

$$0 < (\log Z1/\log Z) < 0.2$$

wherein

Z=ft/fw;

Z1=f1t/f1w;

fw designates the focal length of the entire the zoom lens system at the short focal length extremity;

ft designates the focal length of the entire the zoom lens system at the long focal length extremity;

f1w designates the focal length of a first lens group in said short-focal-length side zooming range; and f1t designates the focal length of said first lens group in said long-focal-length side zooming range.

3. The zoom lens system according to claim 1, wherein at least one zooming lens group is provided on the object side of said switching lens group, and said zoom lens system satisfies the following condition:

$$0 < (\log Zi/\log Z) - (\log Zi'/\log Z') < 0.2$$

wherein

Z=ft/fw

Zi=mit/miw;

Z'=ft'/fw

Zi'=mit'/miw;

fw designates the focal length of the entire the zoom lens system at the short focal length extremity;

ft designates the focal length of the entire the zoom lens system at the short focal length extremity;

ft' designates the focal length of the entire the zoom lens system, at the long focal length extremity, when said moveable sub-lens group is being made stationary at said one of said object-side end and said image-side end;

miw designates the transverse magnification of said switching lens group at the short focal length extremity;

mit designates the transverse magnification of said switching lens group at the long focal length extremity; and mit' designates the transverse magnification of said switching lens group at the long focal length extremity, when said moveable sub-lens group is being made stationary at said one of said object-side end and said image-side end.

4. The zoom lens system according to claim 1, satisfying the following condition:

$$0.01 < \Delta di/fw < 0.3$$

wherein

Δdi designates the traveling distance of said moveable sub-lens group at said intermediate switching focal length.

5. The zoom lens system according to claim 1, wherein said switching lens group comprises said moveable sub-lens group and another sub-lens group, and wherein the power of said moveable sub-lens group is one of negative and positive, and the power of said another sub-lens group is the other of negative and positive.

6. The zoom lens system according to claim 1, wherein said switching lens group comprises a negative sub-lens group and a positive sub-lens group, in this order from said object, and wherein said negative sub-lens group comprises said moveable sub-lens group.

7. The zoom lens system according to claim 2, wherein said zooming lens groups comprise two lens groups.

8. The zoom lens system according to claim 3, wherein said zooming lens groups comprise at least three lens groups.

9. The zoom lens system according to claim 2, satisfying the following condition:

$$0.01 < \Delta di/fw < 0.3$$

wherein $\Delta di$ designates the traveling distance of said moveable sub-lens group at said intermediate switching focal length.

10. The zoom lens system according to claim 3, satisfying the following condition:

$$0.01 < \Delta di/fw < 0.3$$

wherein $\Delta di$ designates the traveling distance of said moveable sub-lens group at said intermediate switching focal length.

* * * * *